May 22, 1923.

H. F. E. L. CALLOT

FRAME FOR VEHICLES TRAVELING UPON RAILWAYS

Filed Nov. 8, 1922

1,455,866

Inventor
H.F.E.L. Callot

Patented May 22, 1923.

1,455,866

UNITED STATES PATENT OFFICE.

HERBERT FRANCIS EDOUARD LUCIEN CALLOT, OF NANCY, MEURTHE-ET-MOSELLE, FRANCE.

FRAME FOR VEHICLES TRAVELING UPON RAILWAYS.

Application filed November 8, 1922. Serial No. 599,718.

*To all whom it may concern:*

Be it known that I, HERBERT FRANCIS EDOUARD LUCIEN CALLOT, citizen of the French Republic, residing at Nancy, Meurthe-et-Moselle, in the Republic of France, have invented new and useful Improvements in Frames for Vehicles Traveling Upon Railways, of which the following is a specification.

The arrangement now in use for the construction of vehicles traveling on railways comprise in all cases the use of axles upon which the wheels are keyed and which are in parallel disposition in pairs, even in the bogie vehicles.

The present invention has for its object a frame which is applicable to this class of vehicles and is chiefly characterized in that the two wheels of each set are freely mounted upon journals respectively secured to small longitudinals, which are connected by inclined arms with a common pivot carried by the vehicle body, the spacing of the journals being maintained invariable by a rigid cross-piece forming with said inclined arms an indeformable triangle adapted to turn on said pivot, the vehicle body being supported on said pivot and on springs secured to the longitudinals and connected with the body by shackles.

In the accompanying drawing, given by way of example, which shows the arrangement used for each set of wheels:

Figure 1:
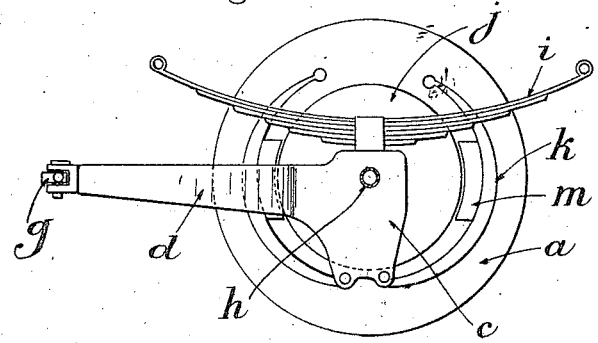
Fig. 1 is a cross-section, along the line 1—1, Fig. 2, of a vehicle frame constructed according to the invention.
Figure 2:
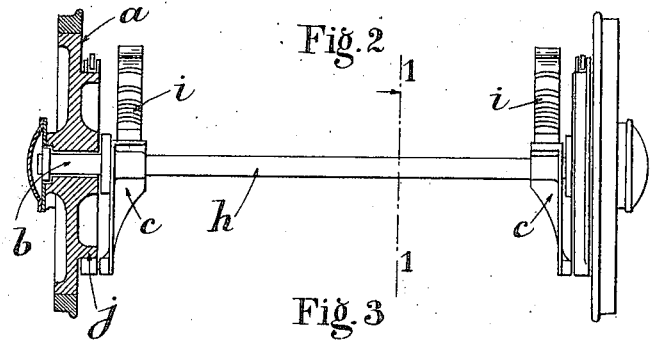
Fig. 2 is an end view showing one wheel in section.
Figure 3:
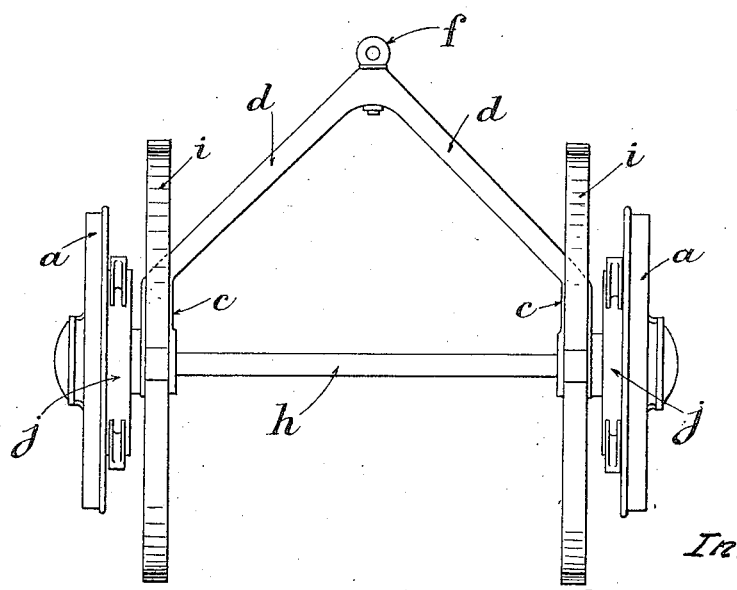
Fig. 3 is a plan view.

As shown in the drawing, the two wheels *a* of the set are freely mounted on journals *b* each of which is secured to a small longitudinal *c*. These latter are connected together by two arms *d* forwardly extending and symmetrically inclined to the axis of rotation passing through the journals. At their point of junction, the two inclined arms *d* have an eye piece *f* wherein may engage a spindle *g* secured to the vehicle body. The spacing between the journals is made invariable by a rigid cross-piece *h* forming with the arms *d* an indeformable triangle which may turn about the spindle when passing around curves.

The vehicle body is carried by this spindle and by springs *i* secured to the longitudinals *c* and so disposed as to permit, through the medium of shackles, the displacements of the vehicle body with respect to these springs.

As will be observed, this arrangement allows the wheels to pass curves without slipping on the rails in spite of the difference between the distances respectively covered by these wheels. On the other hand, it makes it possible, when passing around curves, to have the convergence of the axles of rotation of two sets of like wheels supporting the vehicle body, and this permits the vehicle to readily pass curves of small radius. One also suppresses the trucks serving to connect the sets of wheels, as well as the axles, and one thus reduces to a minimum the weight of the part of the vehicle which is not suspended, with great advantage for the preservation of the fixed and rolling material.

Braking takes place upon drums *j* carried by the wheels, in the same manner as in automobiles, for example by means of two straps *k* pivoting on the longitudinals and carrying the shoes *m*, said straps being moved towards each other for the braking by means of any suitable control device.

Obviously, the invention is not limited to the form of construction described and represented which has been given solely by way of example.

Having now described my invention, what I claim as new and desire to secure by Letters Patent is:

1. A vehicle frame comprising in combination for each pair of wheels, journals for said wheels, short longitudinals respectively supporting said journals, inclined arms integral with said longitudinals and assembled to each other at a point in the median longitudinal plane of the vehicle, means for pivotally connecting the said inclined arms to the vehicle body at said point, a rigid cross member extending between the said longitudinals and forming with said inclined arms an indeformable triangular structure adapted to pivot about said point and springs secured on said longitudinals and adapted to be connected to the vehicle body.

2. A vehicle frame comprising in combination for each pair of wheels, journals for said wheels, short longitudinals respectively supporting said journals, inclined arms integral with said longitudinals and assembled to each other at a point in the median longitudinal plane of the vehicle, means for pivotally connecting the said inclined arms to the vehicle body at said point, a rigid cross-member extending between the said longitudinals and forming with said inclined arms an indeformable triangular structure adapted to pivot about said point, springs secured on said longitudinals and adapted to be connected to the vehicle body and to permit the displacements of said vehicle body with respect to said frames.

In testimony whereof I have signed my name to this specification.

HERBERT FRANCIS EDOUARD LUCIEN CALLOT.